(12) United States Patent
Ibrahim et al.

(10) Patent No.: US 12,133,243 B2
(45) Date of Patent: Oct. 29, 2024

(54) SIDELINK RESOURCE UTILIZATION FOR USER EQUIPMENT OF FULL DUPLEX CAPABILITY

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Ahmed Attia Abotabl, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/650,642

(22) Filed: Feb. 10, 2022

(65) Prior Publication Data

US 2023/0254884 A1  Aug. 10, 2023

(51) Int. Cl.
*H04W 72/541* (2023.01)
*H04L 5/14* (2006.01)
(Continued)

(52) U.S. Cl.
CPC ............ *H04W 72/541* (2023.01); *H04L 5/14* (2013.01); *H04W 52/367* (2013.01);
(Continued)

(58) Field of Classification Search
CPC . H04W 72/541; H04W 52/367; H04W 72/02; H04W 72/0446; H04W 72/046;
(Continued)

(56) References Cited

U.S. PATENT DOCUMENTS

2017/0251485 A1* 8/2017 Kalhan ................. H04W 72/54
2020/0229206 A1* 7/2020 Badic ................. H04W 28/0226
(Continued)

FOREIGN PATENT DOCUMENTS

WO   WO-2017111807 A1 * 6/2017
WO      2021046835 A1    3/2021

OTHER PUBLICATIONS

International Search Report and Written Opinion—PCT/US2023/060287—ISA/EPO—May 2, 2023.
(Continued)

*Primary Examiner* — Chae S Lee
(74) *Attorney, Agent, or Firm* — Patterson & Sheridan, LLP

(57) ABSTRACT

Certain aspects of the present disclosure provide techniques for enhancing sidelink resource utilization for a user equipment (UE) that supports full duplex (FD) communications. For example, an FD UE may receive incoming sidelink communication over a first set of resources and, in FD mode, simultaneously transmit another sidelink communication over the same first set of resources. According to aspects of the present disclosure, the potential interference between the two sidelink communications will be mitigated or reduced, such as by having the FD UE negotiate with other sidelink UEs over transmission power levels and related aspects, such as beam coordination and/or resource subset designation, or the like.

26 Claims, 12 Drawing Sheets

(51) Int. Cl.
*H04W 52/36* (2009.01)
*H04W 72/02* (2009.01)
*H04W 72/044* (2023.01)
*H04W 72/0446* (2023.01)

(52) U.S. Cl.
CPC ....... *H04W 72/02* (2013.01); *H04W 72/0446* (2013.01); *H04W 72/046* (2013.01)

(58) Field of Classification Search
CPC ............. H04W 52/241; H04W 52/281; H04W 52/243; H04W 52/383; H04L 5/14
See application file for complete search history.

(56) References Cited

U.S. PATENT DOCUMENTS

2021/0410084 A1* 12/2021 Li ........................ H04W 52/265
2022/0030575 A1* 1/2022 Farag .................... H04W 72/20

OTHER PUBLICATIONS

Yassine F., et al., "Performance Analysis of Relayed D2D Communications Under Power Control", 2020 43rd International Conference on Telecommunications and Signal Processing (TSP), Jul. 7, 2020, XP033810106, pp. 377-381, Section III.

* cited by examiner

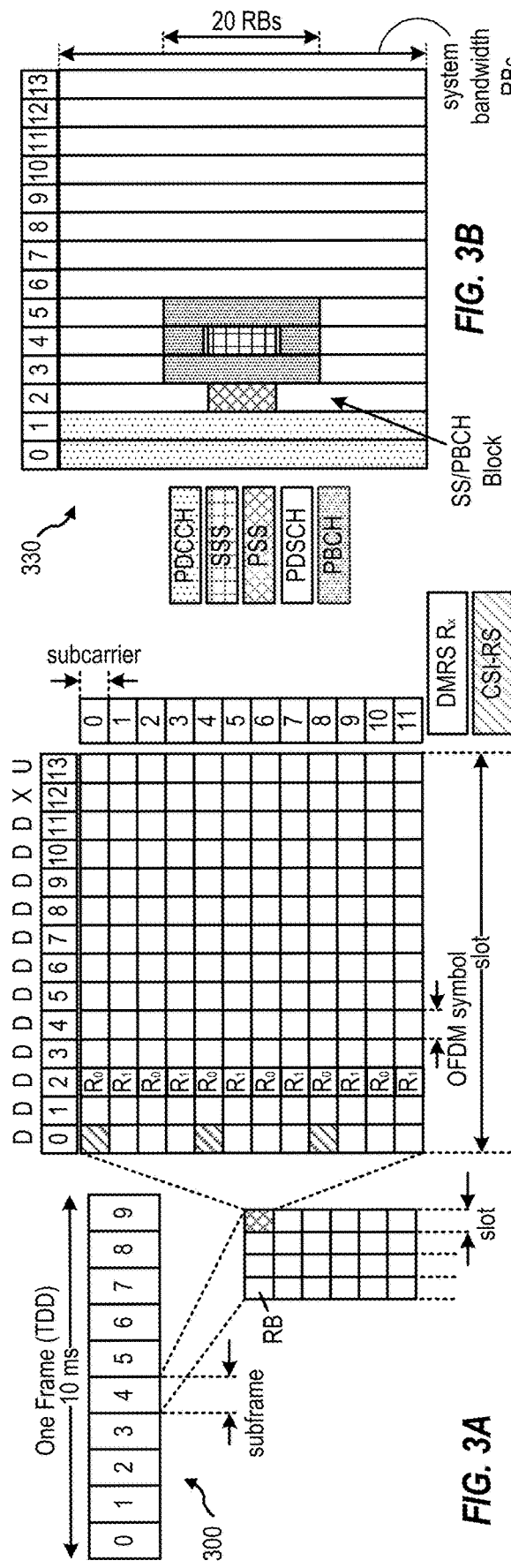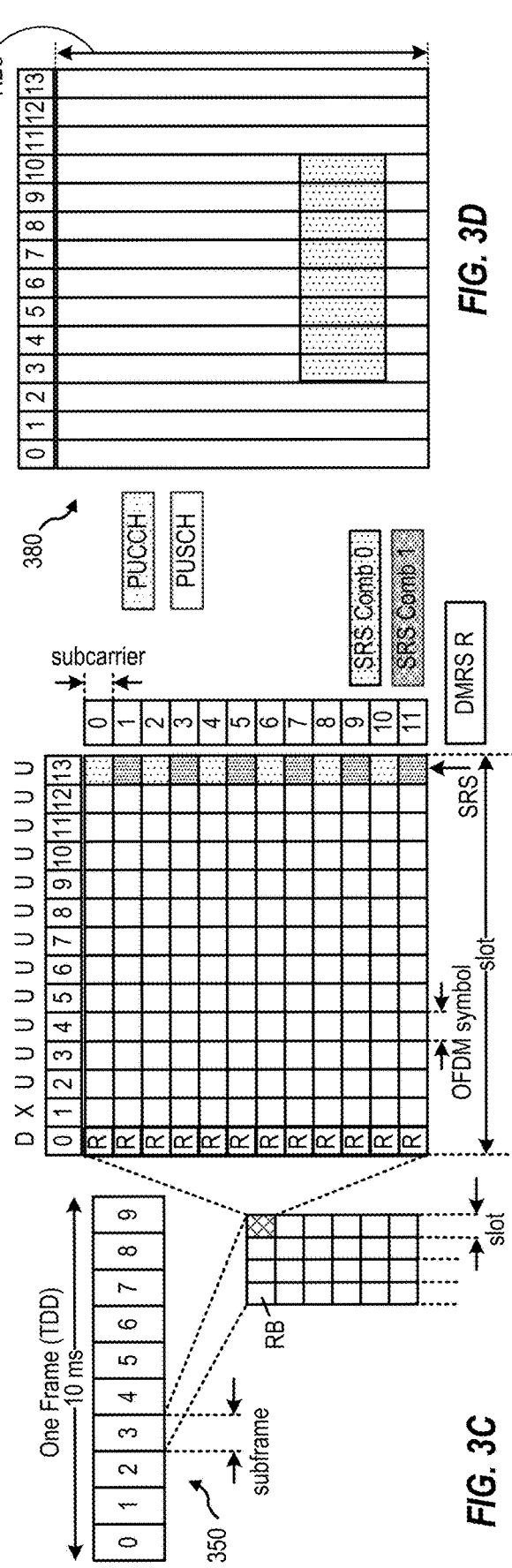

1100

A METHOD FOR WIRELESS COMMUNICATIONS BY
A FIRST USER EQUIPMENT (UE)

1110

NEGOTIATE WITH A SECOND UE, TRANSMISSION POWER LEVELS OF THE SECOND UE FOR A FIRST SIDELINK COMMUNICATION BETWEEN THE FIRST UE AND THE SECOND UE OVER A SET OF SIDELINK RESOURCES HAVING A SET OF SIDELINK SLOTS, AND TRANSMISSION POWER LEVELS OF THE FIRST UE FOR A SECOND SIDELINK COMMUNICATION BETWEEN THE FIRST UE AND A THIRD UE OVER THE SAME SET OF SIDELINK RESOURCES OF THE SAME SET OF SIDELINK SLOTS, TO MITIGATE INTERFERENCE FOR THE THIRD UE WITH RESPECT TO THE SECOND SIDELINK COMMUNICATION

1120

TRANSMIT TO THE THIRD UE OVER THE SAME SET OF SIDELINK RESOURCES OF THE SAME SET OF SIDELINK SLOTS ACCORDING TO THE NEGOTIATED TRANSMISSION POWER LEVELS

*FIG. 11*

SIDELINK RESOURCE UTILIZATION FOR USER EQUIPMENT OF FULL DUPLEX CAPABILITY

INTRODUCTION

Aspects of the present disclosure relate to wireless communications, and more particularly, to techniques for full duplex sidelink communication between user equipments (UEs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communication networks to overcome various challenges.

SUMMARY

One aspect provides a method for wireless communications by a user equipment (UE). The method generally includes negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication. The method further includes transmitting to the third UE over the same set of sidelink resources of the same set of sidelink slots according to the negotiated transmission power levels.

One aspect provides an apparatus of a first UE for wireless communications. The apparatus includes a memory and a processor coupled to the memory. The processor and the memory are configured to negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication. The processor and the memory are further configured to transmit to the third UE over the same set of sidelink resources of the same set of sidelink slots according to the negotiated transmission power levels.

One aspect provides a first UE including means for negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication. The first UE further includes means for transmitting to the third UE over the same set of sidelink resources of the same set of sidelink slots according to the negotiated transmission power levels.

One aspect provides a non-transitory computer-readable medium including computer-executable instructions that, when executed by one or more processors of a first UE, cause the first UE to: negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and transmit to the third UE over the same set of sidelink resources of the same set of sidelink slots according to the negotiated transmission power levels.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 11 illustrates example operations for wireless communications by a first UE, in accordance with some aspects of the present disclosure.

DETAILED DESCRIPTION

Aspects of the present disclosure provide apparatuses, methods, processing systems, and computer-readable mediums for enhancing sidelink resource utilization for a user equipment (UE) that supports full duplex (FD) communications.

In FD mode, a UE may be able to support simultaneous uplink and downlink (UL/DL) transmissions in certain frequency rages. As discussed herein, the FD mode may be extended to sidelink (SL) communications. One challenge with FD sidelink communication includes interference mitigation. For example, when an FD UE transmits over a set of resources (e.g., subchannel and slots), while receiving at the same time, the transmissions may interfere with another UE that is not the intended recipient.

Aspects of the present disclosure provides various techniques for mitigating or avoiding such interference, thus enhancing sidelink resource utilization for FD UEs. For example, a first UE (e.g., FD UE) may negotiate, with a second UE, over transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots. The negotiation aims to mitigate interference for the third UE with respect to the second sidelink communication, such as, for example, by decreasing the transmission power levels of the second UE or increasing the transmission power levels of the first UE when the second sidelink communication has a higher priority than the first sidelink communication. The first UE may then transmit to the third UE over the same set of sidelink resources of the same set of sidelink slots according to the negotiated transmission power levels.

By mitigating interference, aspects of the present disclosure may help FD UEs achieve effective sidelink resource utilization and improve overall system performance and reliability.

Introduction to Wireless Communication Networks

Figure 1:
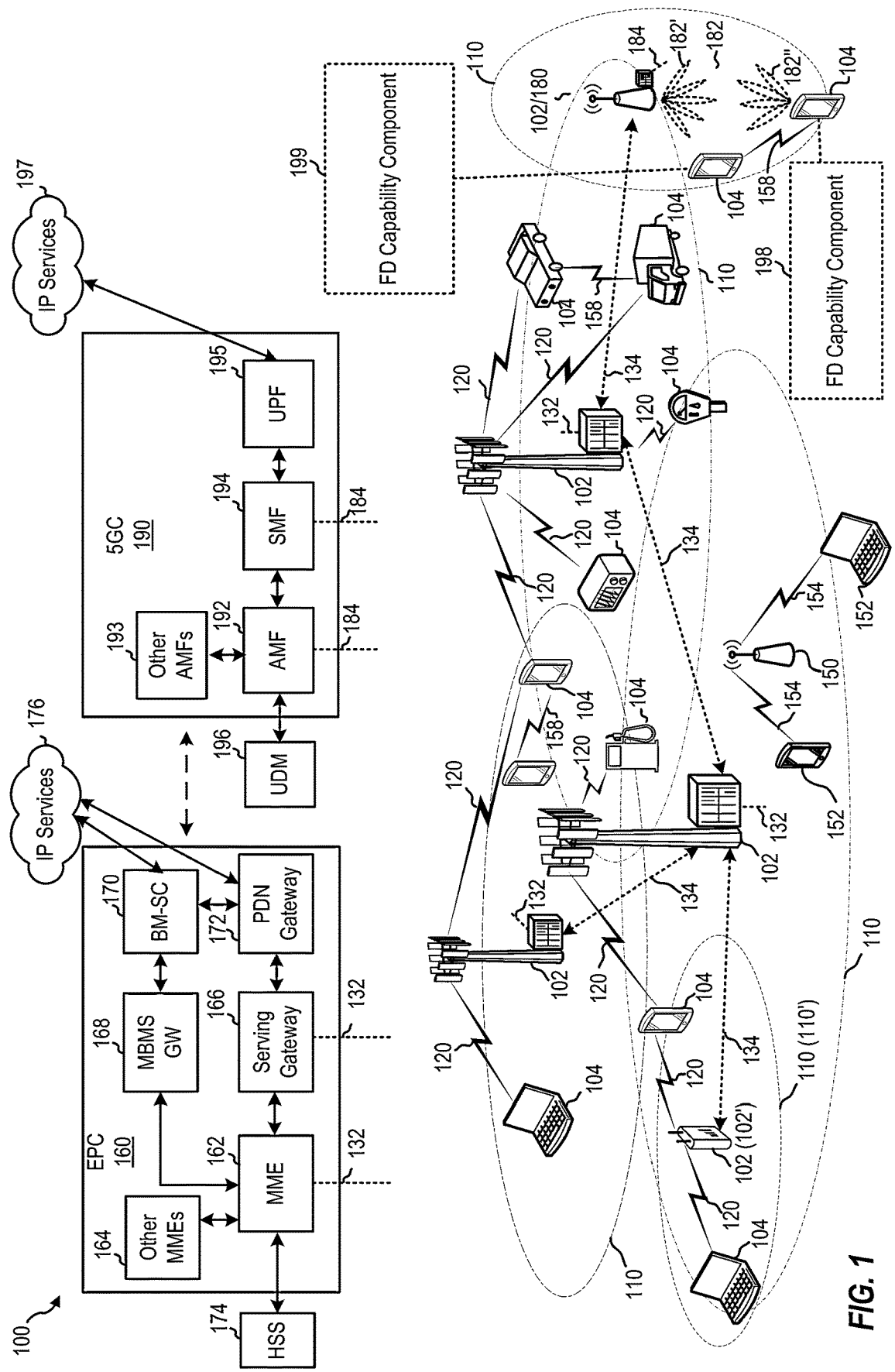
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

A UE 104 includes a FD capability component 198, which may be configured to use sidelink resources in FD mode by receiving and transmitting different sidelink transmissions over the same set of sidelink resources. Similarly, another UE 104 includes FD capability component 199, which may be configured to operate in FD mode with another FD UE in sidelink communications.

Figure 2:
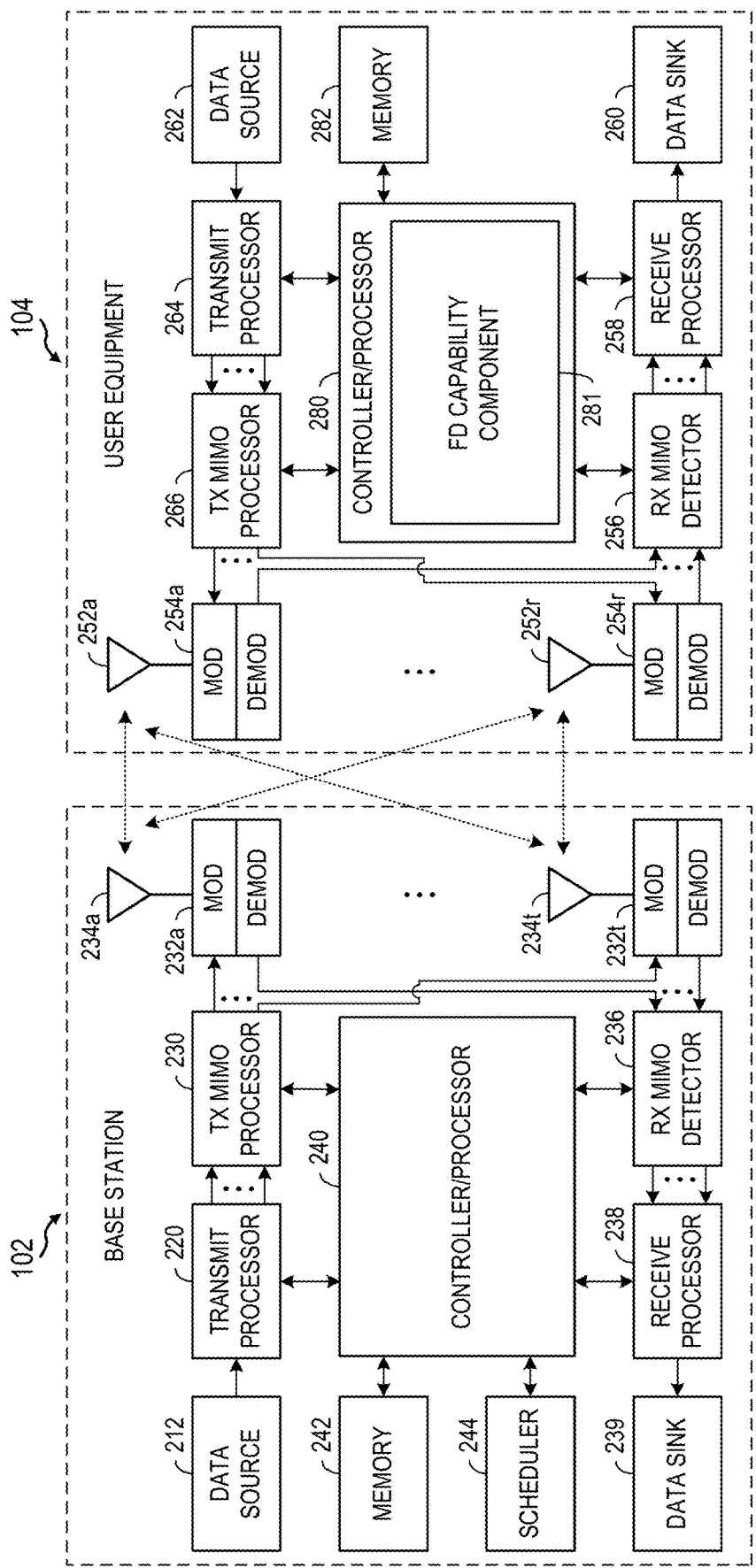
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes FD capability component 281, which may be representative of FD capability component 198 of FIG. 1. Notably, while depicted as an aspect of controller/processor 280, FD capability component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Overview of Half Duplex and Full Duplex Modes

Fifth generation (5G) wireless networks are expected to provide ultra-high data rates and support a wide scope of application scenarios. Wireless full-duplex (FD) communications is an emerging technique and is theoretically capable of doubling the link capacity when compared with half-duplex communications. The main idea of wireless full-duplex communications is to enable radio network nodes to transmit and receive simultaneously on the same frequency band in the same time slot. This contrasts with conventional half-duplex operation, where transmission and reception either differ in time or in frequency.

According to certain aspects, the wireless communication system may support various FD communication modes. One FD gNB can communicate simultaneously in UL and DL with two half-duplex (HD) terminals (i.e., UE1 and UE2) using the same radio resources. Here, the FD BS may be susceptible to self-interference from its downlink to uplink operation and interference from other gNBs. Similarly, UE1 may be susceptible to interference from the other gNB(s) and interference from UE2. In another example, the FD gNB and FD UE1 can communicate simultaneously in UL and DL with each other using the same radio resources. While communicating, the FD UE1 may be susceptible to self-interference, interference from other gNB(s), and interference from UE2.

In some cases, an FD UE can communicate simultaneously in UL and DL with multiple transmission-reception points (e.g., multiple BSs) using the same radio resources. In this example, the FD UE may be susceptible to self-interference from UL to DL operation.

Example Sidelink Communication Scenario with FD UE

Figure 4:
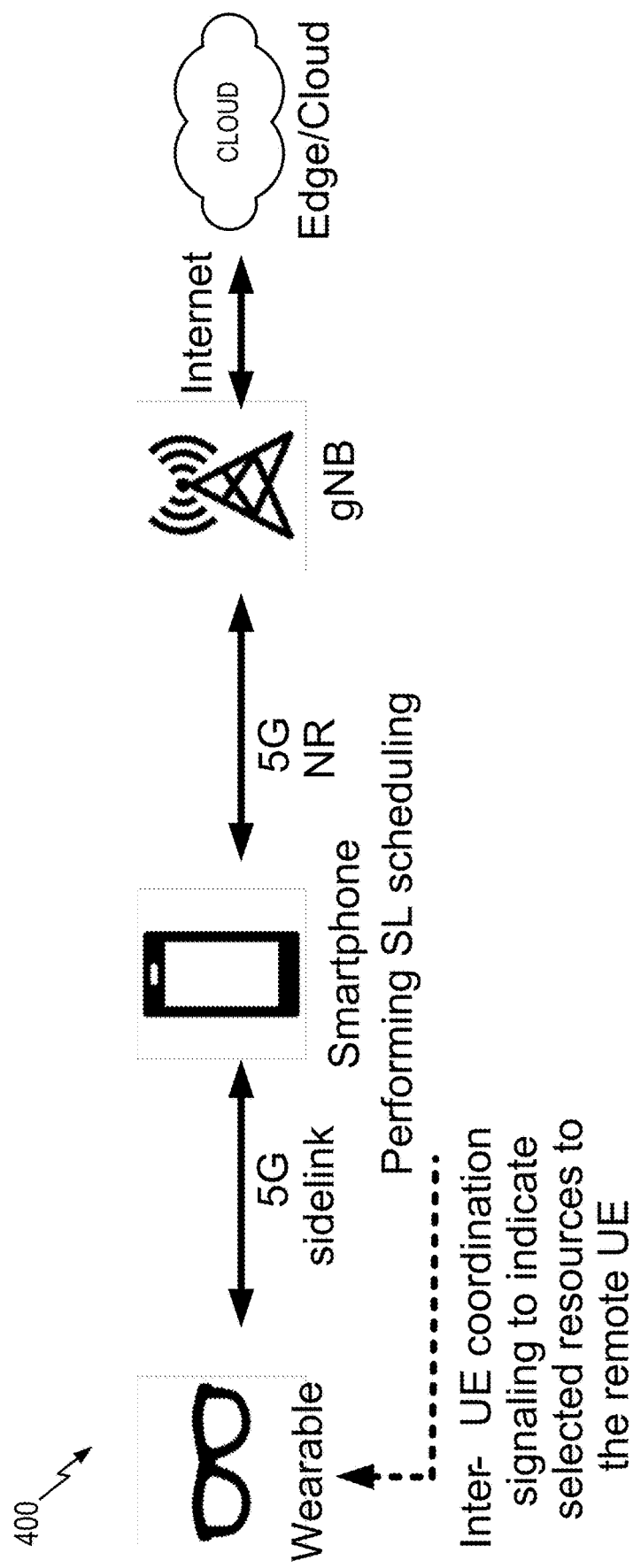
FIG. 4 depicts an example sidelink communication scenario.

FIG. 4 depicts an example sidelink communication scenario 400 taking advantage of full-duplex capabilities. As shown, a smartphone (e.g., a first UE and FD UE) may perform sidelink scheduling with a wearable device (e.g., a second UE, such as a pair of personal digital assistant glasses) to establish 5G sidelink communications. The smartphone may transmit inter-UE coordination signaling to indicate selected resources to the wearable device (or another remote UE). The selected resources may be the same as the sidelink resources the smartphone uses to receive sidelink communications from other UEs. As such, the smartphone may reduce blocking caused by half duplex constraints. For example, by utilizing the FD mode, the smartphone or another FD UE may eliminate the need for two blind transmissions. The FD mode may support efficient UE to network and UE-to-UE relaying. When applied to sidelink communications, the FD mode supports simultaneous SL transmissions and sensing in Mode 2. Aspects of the present disclosure provides techniques for enhancing the inter-UE coordination to better utilize sidelink resources for FD UEs.

Example Full Duplex (FD) Operation Modes and Subband FD Format

Figure 5A:
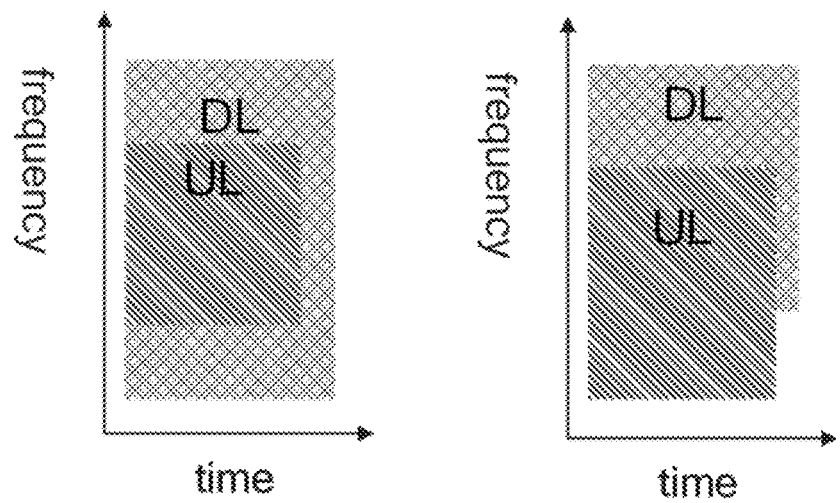
FIG. 5A and FIG. 5B depict different examples of full duplex (FD) resource utilization, in accordance with some aspects of the present disclosure.
Figure 5B:
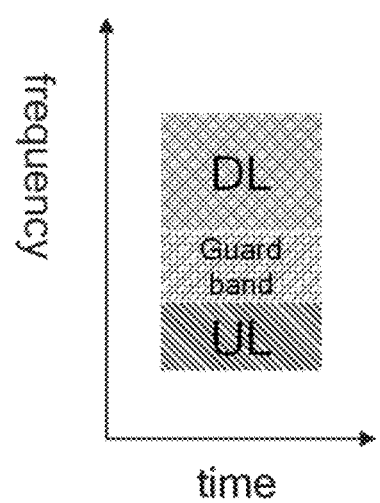

In addition to supporting various FD communication modes (also referred to herein as deployments), the wireless communication system may support various types of FD operation. FIG. 5A and FIG. 5B depict different examples of full duplex (FD) resource utilization, in accordance with some aspects of the present disclosure.

FIG. 5A illustrates an example of in-band full duplex (IBFD), which is one type of FD operation in which devices can transmit and receive at the same time and on the same frequency resources. In some cases, the DL and UL may fully share the same IBFD time/frequency resource (e.g., there may be a full overlap of the DL and UL allocations within the IBFD time/frequency resource). In some cases, the DL and UL may partially share the same IBFD time/frequency resource (e.g., there may be a partial overlap of the DL and UL allocations within the IBFD time/frequency resource).

FIG. 5B illustrates an example of sub-band FDD (also referred to as flexible duplex), which is another type of FD operation in which devices can transmit and receive at the same time but on different frequency resources. With Sub-band DFF, the DL resource may be separated from the UL resource in the frequency domain by a guard band. This mode of operations reduces the self-interference cancellation requirements on the FD device since the leakage is lower.

Figure 6:
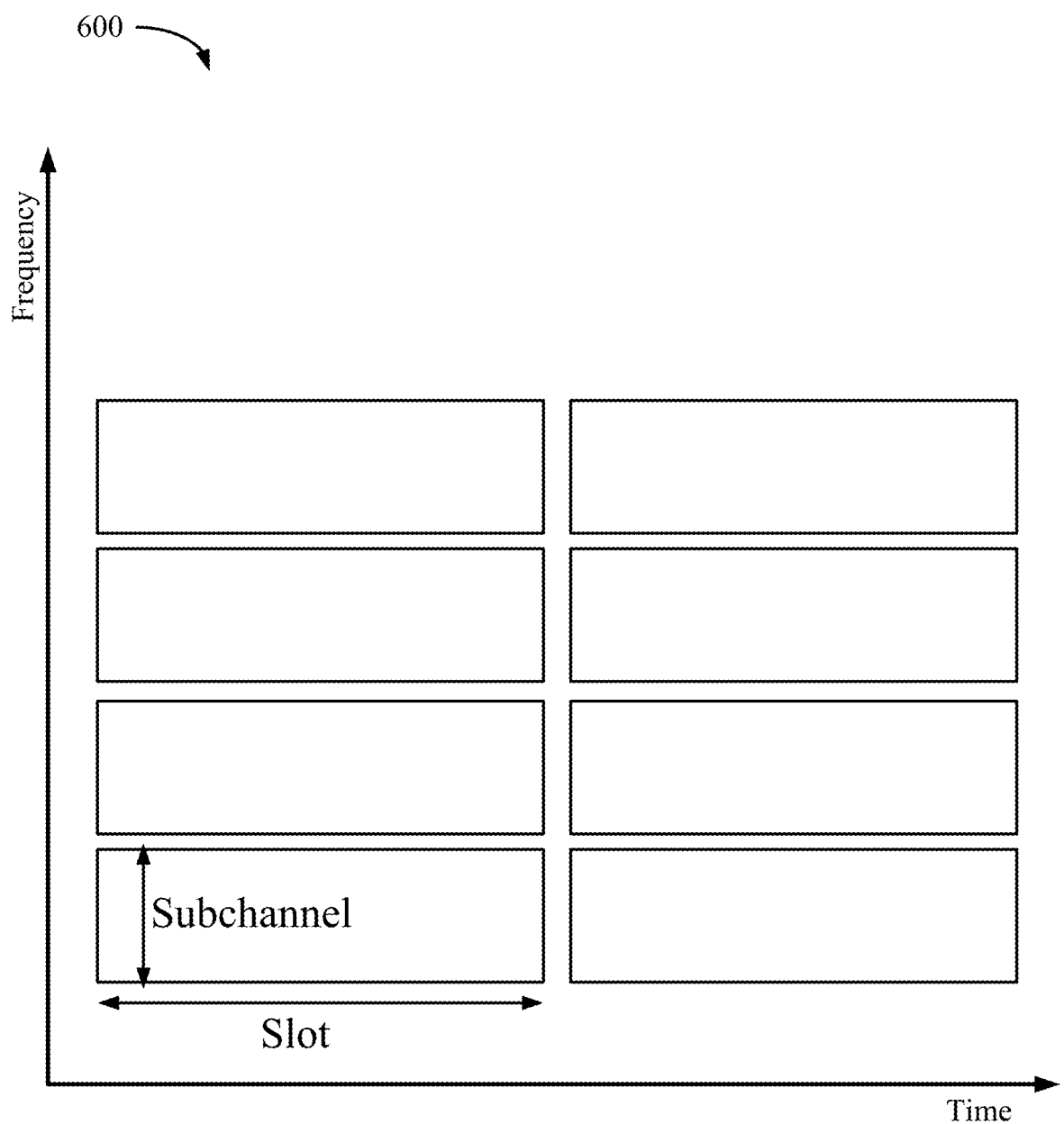
FIG. 6 illustrates an example sidelink resource pool for sidelink communication, in accordance with some aspects of the present disclosure.

FIG. 6 illustrates an example sidelink resource pool 600 for sidelink communication, in accordance with certain aspects of the present disclosure. As illustrated in FIG. 6, the sidelink resource pool 800 may be partitioned into a variable number of sub-channels and slots (e.g., the minimum resource allocation unit in the frequency domain and the time domain, respectively). The sub-channels may include a consecutive set of physical resource blocks (PRBs) spanning different frequencies. Conventional sub-channel sizes may be (pre)configured, for example, to one of a set of possible sizes, such as: {10, 15, 20, 25, 50, 75, 100} PRBs.

In certain aspects, resource allocation may be reservation based in NR sidelink communications. More specifically, resource allocations may be made in units of sub-channels in the frequency domain and may be limited to one slot in the time domain. A transmission may reserve resources in the current slot and in up to two future slots. Reservation information may be carried in sidelink control information (SCI). Sidelink control information (SCI) may be transmitted in two stages. A first stage SCI (SCI-1) may be transmitted on a physical sidelink control channel (PSCCH) and may contain resource reservation information as well as information needed to decode a second stage SCI (SCI-2). A SCI-2 may be transmitted on the physical sidelink shared channel (PSSCH) and may contain information needed to decode data on the shared channel (SCH) and to provide feedback (e.g., acknowledgments (ACKs) or negative acknowledgments (NACKs)) over a physical sidelink feedback channel (PSFCH)).

In certain aspects, each resource pool may further be (pre-)configured with one of the two resource allocation modes. In Mode 1 resource allocation, a gNB assigns resources for SL transmission; both dynamic allocation via DCI format 3-x and configured transmissions (both Type-1 and Type-2) are supported. In Mode 2 resource allocation, a UE senses the resources. Based on the outcome of sensing (e.g., priority of different transmissions and RSRP), a UE selects some resources for its transmission. Sidelink communications take place in transmission or reception resource pools. The minimum resource allocation unit is a sub-channel in frequency.

In the frequency domain, a sidelink resource pool may include a number of (e.g., numSubchannel) contiguous sub-channels. A sub-channel often includes a number of (e.g., subchannelsize) contiguous PRBs. numSubchannel and subchannelsize are higher layer parameters. In general, resource allocation in time is one slot. Some slots are not available for sidelink. Some slots contain feedback resources. The resource allocation may be configured by radio resource control (RRC) configuration, which may be preconfigured (e.g., preloaded on UE) or later configured (e.g., by a gNB).

For example, the set of SL slots is determined as follows. The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$. The slot index is relative to slot #0 of the radio frame corresponding to SFN 0 of the serving cell or DFN 0.

The set may include all the slots except the following slots ($N_{S\_SSB}$ slots, and $N_{nonSL}$ slots, and reserved slots). $N_{S\_SSB}$ are slots in which S-SS/PSBCH block (S-SSB) is configured. $N_{nonSL}$ are slots in each of which at least one of Y-th, (Y+1)-th, ..., (Y+X−1)-th symbols are not semi-statically configured as UL as per the higher layer parameter tdd-UL-DL-ConfigurationCommon or sl-TDD-Configuration, where Y and X are set by the higher layer parameters sl-StartSymbol and sl-LengthSymbols, respectively.

The reserved slots are determined by the following steps. First, the remaining slots excluding $N_{S\_SSB}$ slots and $N_{nonSL}$ slots from the set of all the slots are denoted by $$\left(l_0, l_1, \ldots, l_{(10240 \times 2^\mu - N_{S_{SSB}} - N_{nonSL} - 1)}\right)$$

arranged in increasing order of slot index. Second, a slot $l_r$ ($0 \leq r < 10240 \times 2^\mu - N_{S_{SSB}} - N_{nonSL}$) belongs to the reserved slots if $$r = \left\lfloor \frac{m \cdot (10240 \times 2^\mu - N_{S_{SSB}} - N_{nonSL})}{N_{reserved}} \right\rfloor,$$

here m=0, 1, ..., $N_{reserved}-1$ and $N_{reserved}=(10240 \times 2^\mu - N_{S_{SSB}} - N_{nonSL}) \bmod L_{bitmap}$ where $L_{bitmap}$ denotes the length of bitmap configured by higher layers. The slots in the set are arranged in increasing order of slot index.

In some cases, the UE determines the set of slots assigned to a sidelink resource pool as follows. First, a bitmap ($b_0$, $b_1$, ..., $b_{L_{bitmap}-1}$) associated with the resource pool is used where $L_{bitmap}$ the length of the bitmap is configured by higher layers. Second, a slot $t_k^{SL}$ ($0 \leq k < 10240 \times 2^\mu - N_{S_{SSB}} -$ $N_{nonSL}-N_{reserved}$) belongs to the set if $b_{k'}=1$ where k'=k mod $L_{bitmap}$. Finally, the slots in the set are re-indexed such that the subscripts i of the remaining slots $t'^{SL}_i$ are successive {0, 1, . . . , $T'_{max}-1$} where $T'_{max}$ is the number of the slots remaining in the set.

Figure 7:
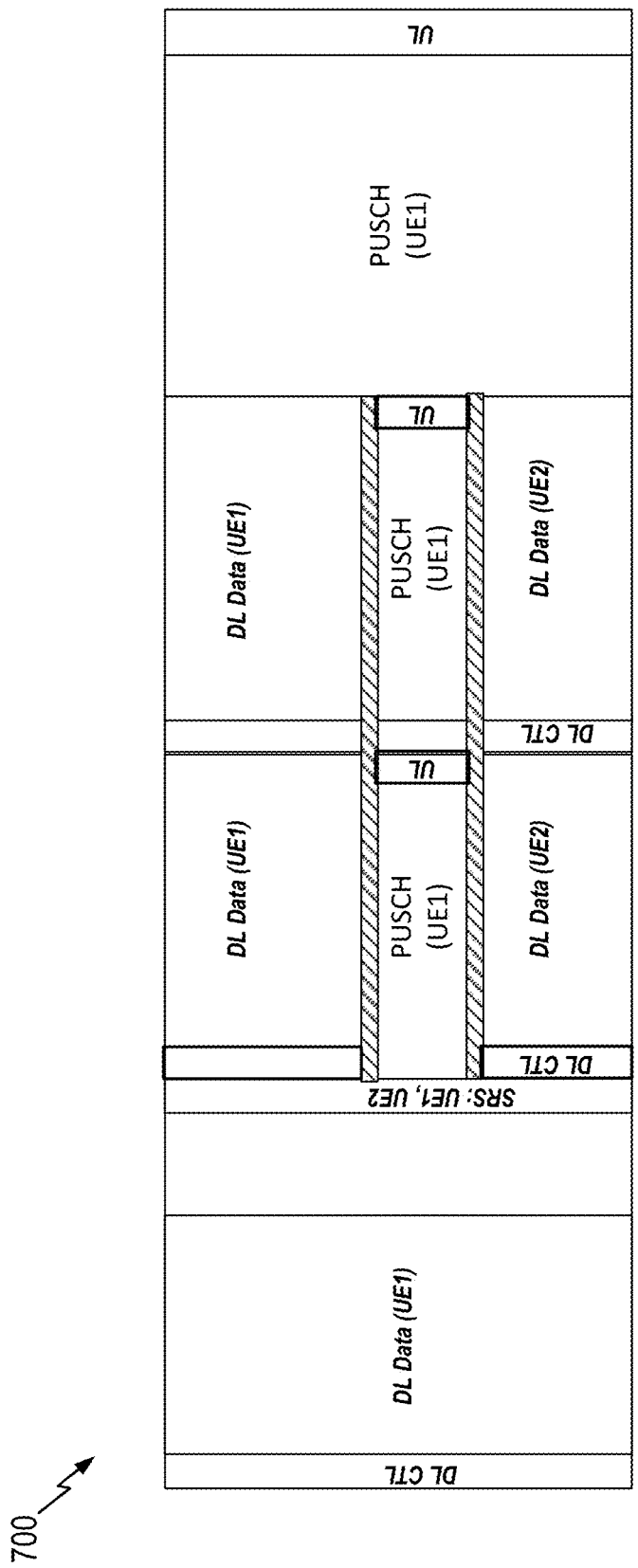
FIG. 7 depicts an example sub-band full duplex (SBFD) slot format, in accordance with some aspects of the present disclosure.

FIG. 7 depicts an example sub-band full duplex (SBFD) slot format 700, in accordance with some aspects of the present disclosure. As shown, the SBFD slot format includes downlink data for UE1 (a first UE) and UE2 (a second UE), as well as uplink data PUSCH for UE1 in certain slots. Such slot that includes both downlink and uplink data may be defined as a downlink and uplink ('D+U') slot, which may comply with the following definitions. The 'D+U' slot is a slot in which the band is used for both uplink (UL) and downlink (DL) transmissions. The DL and UL transmissions may occur in overlapping bands (in-band full-duplex) or adjacent bands (sub-band full-duplex). In a given 'D+U' symbol, the HD UE may either transmit in the UL band or receive in the DL band. In a given 'D+U' symbol, the FD UE may transmit in the UL band and/or receive in the DL band in the same slot. A 'D+U' slot may contain DL only symbols, UL only symbols, or full-duplex symbols.

Figure 8:
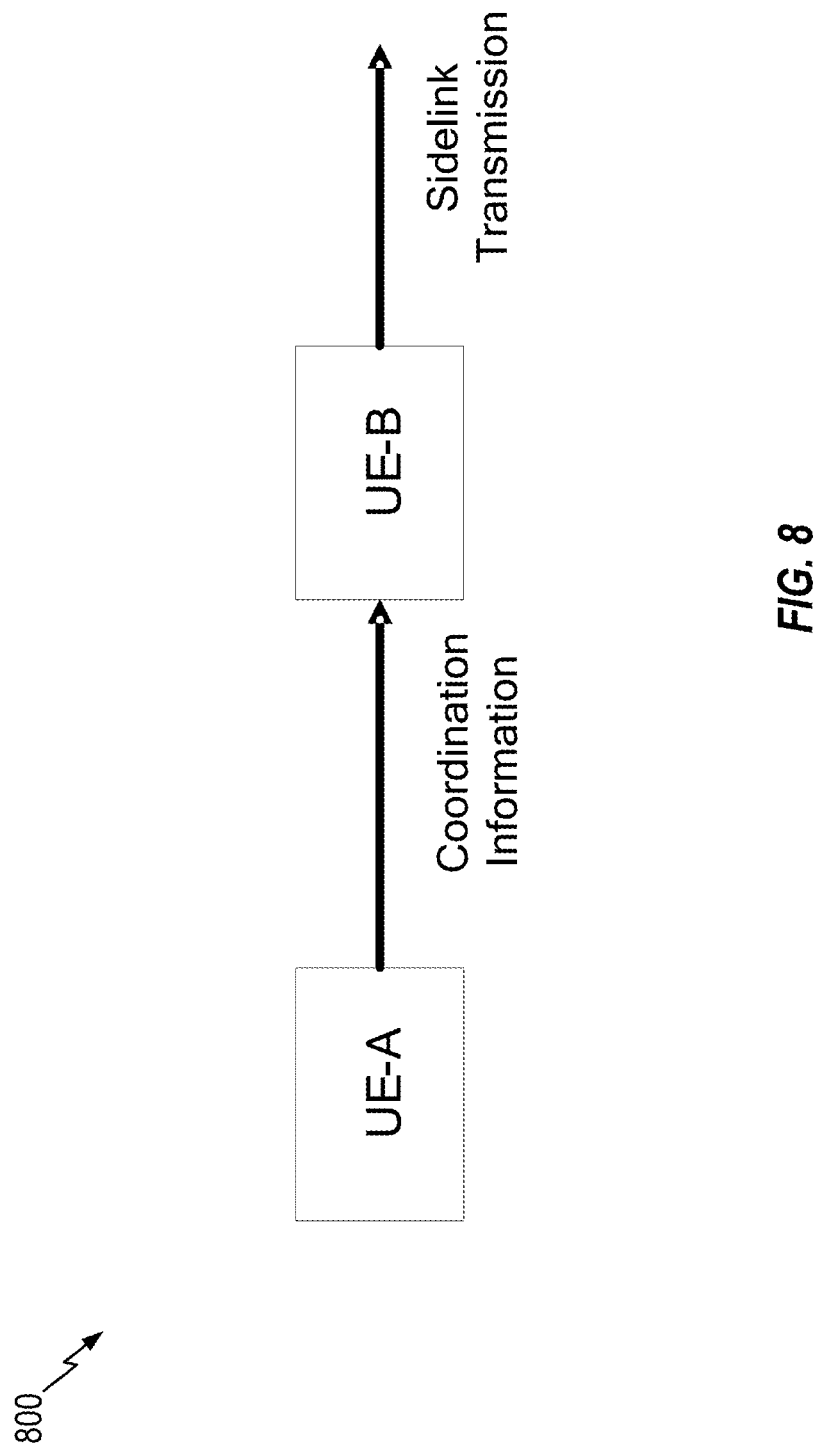
FIG. 8 illustrates an example of inter-user equipment (UE) coordination, in accordance with some aspects of the present disclosure.

FIG. 8 illustrates an example of inter-UE coordination, in accordance with some aspects of the present disclosure. As shown, UE-A may generate and share coordination information with UE-B. Although two UEs are shown, coordination may be performed among any number of UEs (e.g., within a group of UEs). For example, one UE-A could be sharing information with multiple UE-Bs. Similarly, one UE-B could be receiving information from multiple UE-As. The coordination information helps UE-B better select resources for transmissions to avoid resource collisions.

In some cases, the schemes of inter-UE coordination in Mode 2 may be categorized as being based on the following types of resource indications sent by UE-A to UE-B. In one type, UE-A sends to UE-B the set of resources preferred for UE-B's transmission, such as based on UE-A's sensing result. In another type, UE-A sends to UE-B the set of resources not preferred for UE-B's transmission, such as based on UE-A's sensing result and/or expected/potential resource conflict. In another type, UE-A sends to UE-B the set of resource where a resource conflict is detected. These different types of resource indication may be used in combination with each other.

In some cases, the resource indications shared via inter-UE coordination may be used to select resources for FD communication. Aspects of the present disclosure further provide details on how to reuse the same resources for transmission and reception by the FD UE. For example, an FD UE-B may receive a transmission from UE-A (unicast/groupcast session-1) and reuse the same SL resources to transmit to other UEs, e.g., UE-C (unicast/groupcast session-2). While operating in such an FD mode, however, interference may occur at UE-C.

Aspects Related to FD Sidelink Communications and Interference Mitigation

Aspects of the present disclosure provide mechanisms that may help enhance resource utilization by sidelink UEs operating in FD modes, by minimizing or mitigating the associated interferences.

Figure 9A:
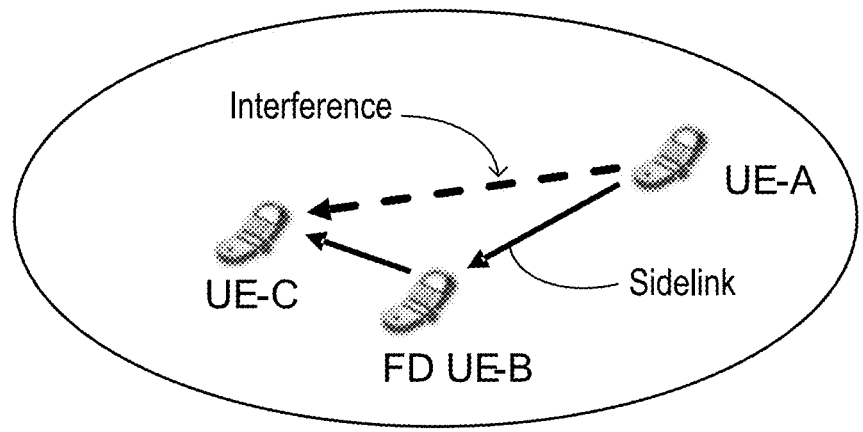
FIG. 9A and FIG. 9B illustrate examples of sidelink communications by one or more FD UEs, in accordance with some aspects of the present disclosure.
Figure 9B:
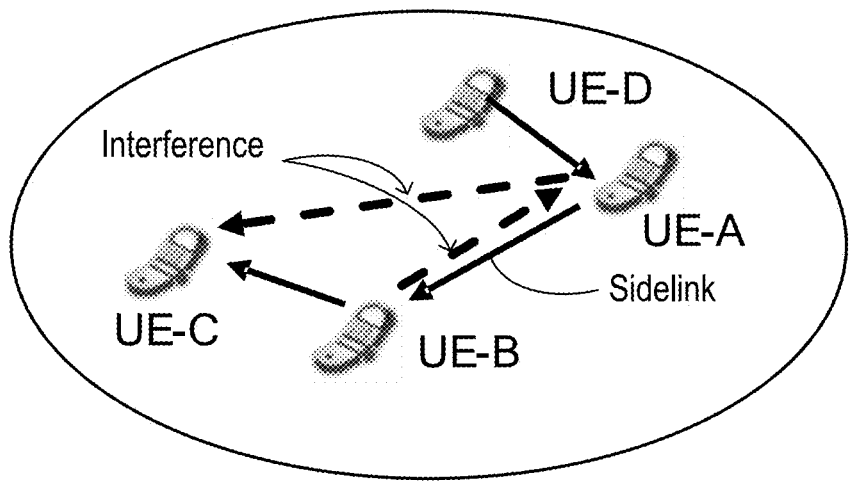

FIG. 9A and FIG. 9B illustrate example sidelink scenarios in which aspects of the present disclosure may be utilized. In the example shown in FIG. 9A, UE-B is operating in FD mode. In this FD mode, UE-B receives a first sidelink transmission from UE-A, while also sending a second sidelink transmission to UE-C. Because the first and the second sidelink transmissions overlaps in time and may overlap in frequency, interference may occur. In the example, the dashed line indicates interference caused to the reception by UE-C of the second sidelink transmission from UE-B, due to the first sidelink transmission from UE-A.

Of course, more complicated scenarios may result in additional sources of interference. For example, FIG. 9B illustrates another scenario where UE-A also operates in FD mode. In the illustrated example, UE-A receives a third sidelink transmission from UE-D while UE-A transmits the first sidelink transmission to UE-B. As such, UE-A's reception of the third sidelink transmission from UE-D may be interfered with by the second sidelink transmission from UE-B.

Figure 10:
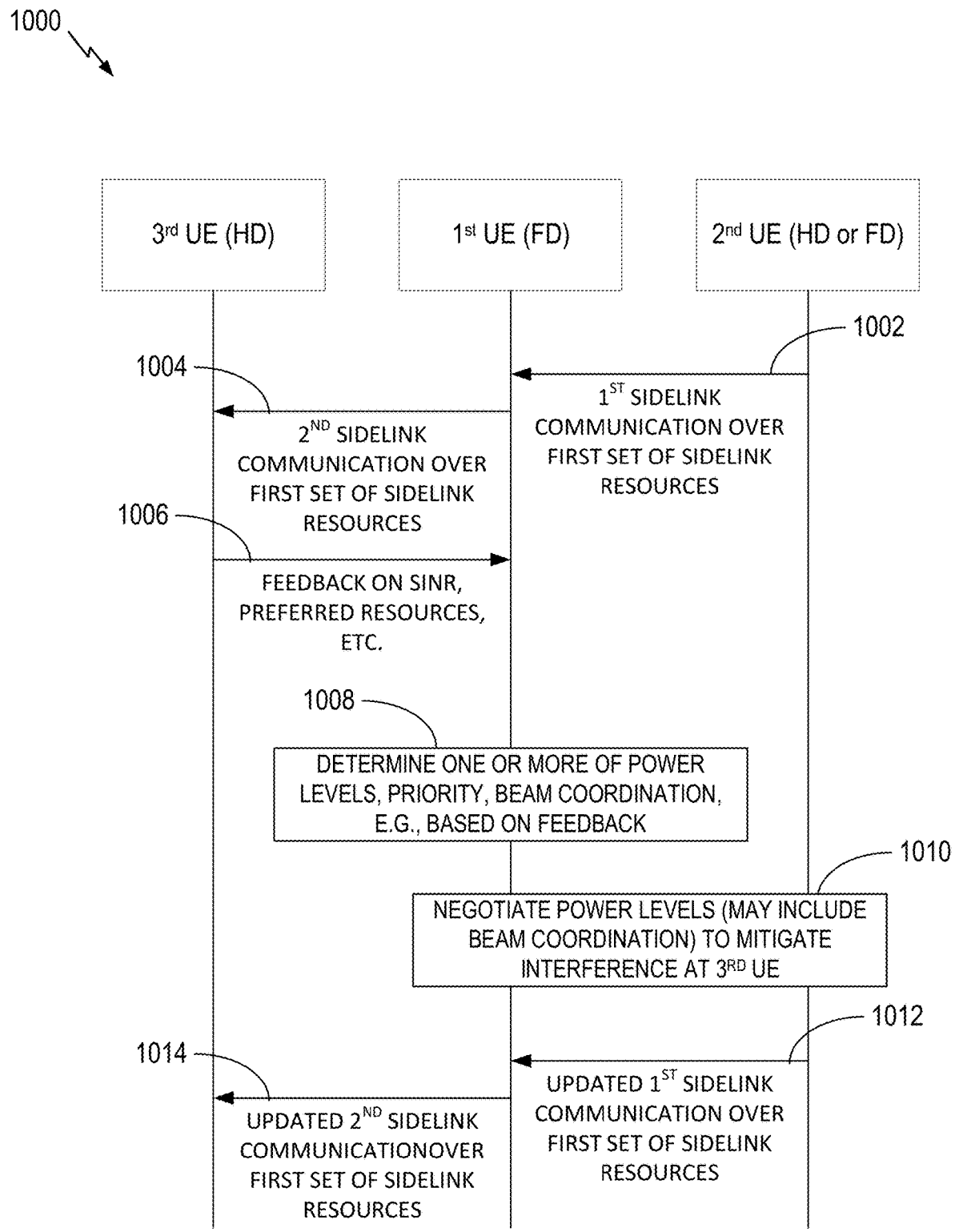
FIG. 10 illustrates an example call flow diagram of FD sidelink communications, in accordance with some aspects of the present disclosure.

FIG. 10 illustrates an example call flow diagram of FD sidelink communications, with interference mitigation, in accordance with aspects of the present disclosure. The example operations may help mitigate the interference problems identified in FIGS. 9A and 9B, according to aspects of the present disclosure.

The UEs shown in FIG. 10 may be considered analogous to those shown in FIG. 9A. For example, the first UE may be analogous to UE-B of FIG. 9A, the second UE may be analogous to UE-A of FIG. 9A, and the third UE may be analogous to UE-C of FIG. 9A. In the illustrated example, the first UE operates in FD mode (as does UE-B in FIG. 9A).

At 1002, the second UE transmits a first sidelink communication over a first set of sidelink resources to the first UE. At 1004, operating in FD mode, the first UE transmits a second sidelink communication, but over the same first set of sidelink resources, to the third UE.

As described in greater detail below, the first UE may decide whether to reuse a resource "n" for sidelink transmission to the third UE based on inter-UE coordination information (e.g., non-preferred resources) from the first UE.

If the first UE decides to use the resource "n," then the third UE measures signal-to-interference-to-noise ratio (SINR) and reports the measurement to the first UE. If the reported SINR is less than a threshold (e.g., SINR_thr), then the first UE may calculate a power back-off value and send the calculated value to the second UE. In some cases, the value may depend on priority levels of the first and the second sidelink communications.

At 1006, the third UE transmits feedback on SINR, and possibly other information, to the first UE. For example, the other information may include preferred resources (preferred by the third UE). The SINR may reflect the interference between the first and the second sidelink communications as observed by the third UE.

At 1008, the first UE determines one or more potential adjustments based on the feedback, that may be applied to subsequent FD SL communications. For example, the potential adjustments may be adjustments to transmission power levels and/or beam coordination based on the feedback. For example, the determination may identify priority levels associated with the first and the second sidelink communications and adjustments may be made based on the priority levels.

At 1010, the first UE negotiates with the second UE over the power levels for mitigating the interference (for future SL communications). At 1012, the second UE transmits the first sidelink communication using updated power levels or beam directions to the first UE. At 1014, the first UE transmits the second sidelink communication using updated power levels or beam directions to the third UE.

In some cases, for the negotiations, the first UE may signal to the second UE (a request for the second UE) to lower its transmission power, such as when a second sidelink communication (from the $1^{st}$ UE to the $3^{rd}$ UE) has a priority higher than the priority of the first sidelink communication (from the $2^{nd}$ UE to the $1^{st}$ UE), in an effort to reduce interference to the second sidelink communication.

In some cases, the negotiation of power levels may be relative. For example, the negotiation may include evaluating the reception of the first sidelink communication at the first UE. The first UE may increase its transmission power levels if the power levels of the second UE should be maintained for the first UE to properly receive the first sidelink communication.

In some cases, based on SINR feedback from the third UE at 1006, the first UE may determine and provide specific power offset values to the second UE. For example, for periodic transmissions between the first and the third UE, the first UE may signal power back-off values to the second UE. In some cases, dedicated resources (similar to the resources used for inter-UE coordination) can be used for signaling this type of feedback.

In some cases, in addition to or instead of the power level adjustments, the negotiation between the first and the second UEs may involve coordinating transmission beams to minimize the interference. For example, although overlapping time (and/or frequency) resources may be used, different beam directions may help mitigate the potential interference.

In some cases, the second UE may also operate in FD mode, in a similar scenario shown in FIG. 9B. In such cases, the second UE may receive a third sidelink communication from a fourth UE (not shown in FIG. 10).

When both the first and the second UEs are operating in FD mode, both of the FD UEs may use the same resources for both sidelink reception and transmission. Therefore, the first and the second UEs may share preferred resources and indicate the duplexing mode for the resources. For example, the FD UEs may indicate FD resources to be reused when transmitting sidelink transmissions to other UEs. Various options may be utilized in an effort to mitigate interference in this scenario.

According to a first option, only one of the FD UEs may be allowed to (simultaneously) receive and transmit on the same sidelink resource. Determining which UE is allowed to operate in FD mode may be via the negotiation at 1010 based on the priority comparison between all the sidelinks.

According to a second option, both FD UEs may be allowed to simultaneously transmit and receive on the same resource with coordination. For example, based on priority of the different sidelinks, the first UE can back-off the power to minimize interference to the second UE. In some cases, beam coordination may also be implemented to minimize interference. For example, the first UE may communicate with the second UE with a beam that results in the least interference when another beam used to communicate with the third UE (such beam coordination may also be applied on other sidelinks).

For example, when mitigating interference from the first UE to the second UE, the first UE may signal to the second UE preferred resources for reception from the first UE (and may also announce that the first UE will operate in FD mode). Alternatively, the second UE may announce which preferred resource the second UE would use for transmitting the first sidelink communication to the first UE. One or both of the aforementioned two options may then be applied on the preferred resources indicated.

In another example, when mitigating interference from the second UE to the third UE, the first UE may share a destination identifier (ID, dest_ID) of possible interference aggressors (e.g., the second UE) to the receiving UE (the third UE). Based on the dest_ID, the third UE may track the interference by measuring reference signal received power (RSRP). The third UE may then signal to the first UE on the preferred resources for receiving the second sidelink communication, which may account for the interference from the second UE. The aforementioned power levels adjustments and beam coordination may also be applied to the indicated preferred resources.

Example Methods of Operations

FIG. 11 illustrates example operations 1100 for wireless communication by a UE. The operations 1100 may be performed, for example, by a UE (e.g., such as a UE 104 of FIG. 1 or the first UE of FIG. 10) to enhance sidelink resource utilization when the UE operates in full-duplex (FD) mode.

At 1110, the first UE negotiates with a second UE to determine/adjust transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots. The first UE negotiates with the second UE to mitigate interference for the third UE with respect to the second sidelink communication. For example, the first UE may indicate to the second UE to reduce transmission power levels when the second sidelink communication has a higher priority than the first sidelink communication.

At 1120, the first UE transmit to the third UE over the same set of sidelink resources of the same set of sidelink slots according to the negotiated transmission power levels.

In aspects, the first UE is an FD UE configured to receive and transmit signals over the same set of sidelink resources.

In aspects, the first sidelink communication between the first UE and the second UE includes a unicast session or groupcast session by the second UE.

In aspects, negotiating with the second UE may include transmitting, to the second UE, an indication for the second UE to reduce the transmission power levels of the second UE.

In aspects, negotiating with the second UE may include receiving, from the third UE, a feedback on signal-to-interference-plus-noise ratio (SINR) regarding the second communication; and transmitting, to the second UE, an indication for the second UE to reduce the transmission power levels of the second UE by an offset value based on the feedback.

In aspects, the first UE may determine whether to transmit to the third UE over the same set of sidelink resources of the same set of slots based on inter-UE coordination information.

In aspects, both the first UE and the second UE are FD UEs. The second UE may receive sidelink transmissions from a fourth UE over the set of sidelink resources. The first UE may negotiate with the second UE upon determining only one of the first UE and the second UE to operate in FD mode over the same set of sidelink resources. In some cases, the determining is based on a priority ranking of the sidelink communications between the first UE and the second UE, the first UE and the third UE, and the third UE and the fourth UE.

In aspects, both the first UE and the second UE are FD UEs. The second UE receives sidelink transmissions from a fourth UE over the set of sidelink resources. The first UE may negotiate with the second UE upon determining both the first UE and the second UE are to operate in FD mode over the same set of sidelink resources. The negotiation may also include adjusting transmission power levels of the first UE and the second UE or coordinating beam selection by the first UE for transmission and reception. For example, adjusting transmission power levels may include reducing transmission power levels at the first UE to minimize interference imposed to the second UE.

In some cases, coordinating beam selection by the first UE for transmission and reception may include transmitting in a first beam to the third UE, while receiving in a second beam from the second UE. The first beam and the second beam incur a minimal interference with each other compared to interferences between other beams available to the first UE, the second UE, and the third UE.

In some cases, the first UE may signal to the second UE a set of preferred resources for the FD mode. The set of preferred resources may be a subset of the set of sidelink resources. In some cases, the set of preferred resources for the FD mode comprises FD and half-duplex (HD) resources. The FD resources may be used by both the first UE and the second UE for transmission. The HD resources may be used by the first UE for reception.

In some cases, the first UE may transmit, to the third UE, a destination identifier (ID) of the second UE or a source ID of the first sidelink communication; receiving, from the third UE, a set of preferred resources based on measurements at the third UE of interference associated with the destination ID or the source ID.

Example Wireless Communication Devices

Figure 12:
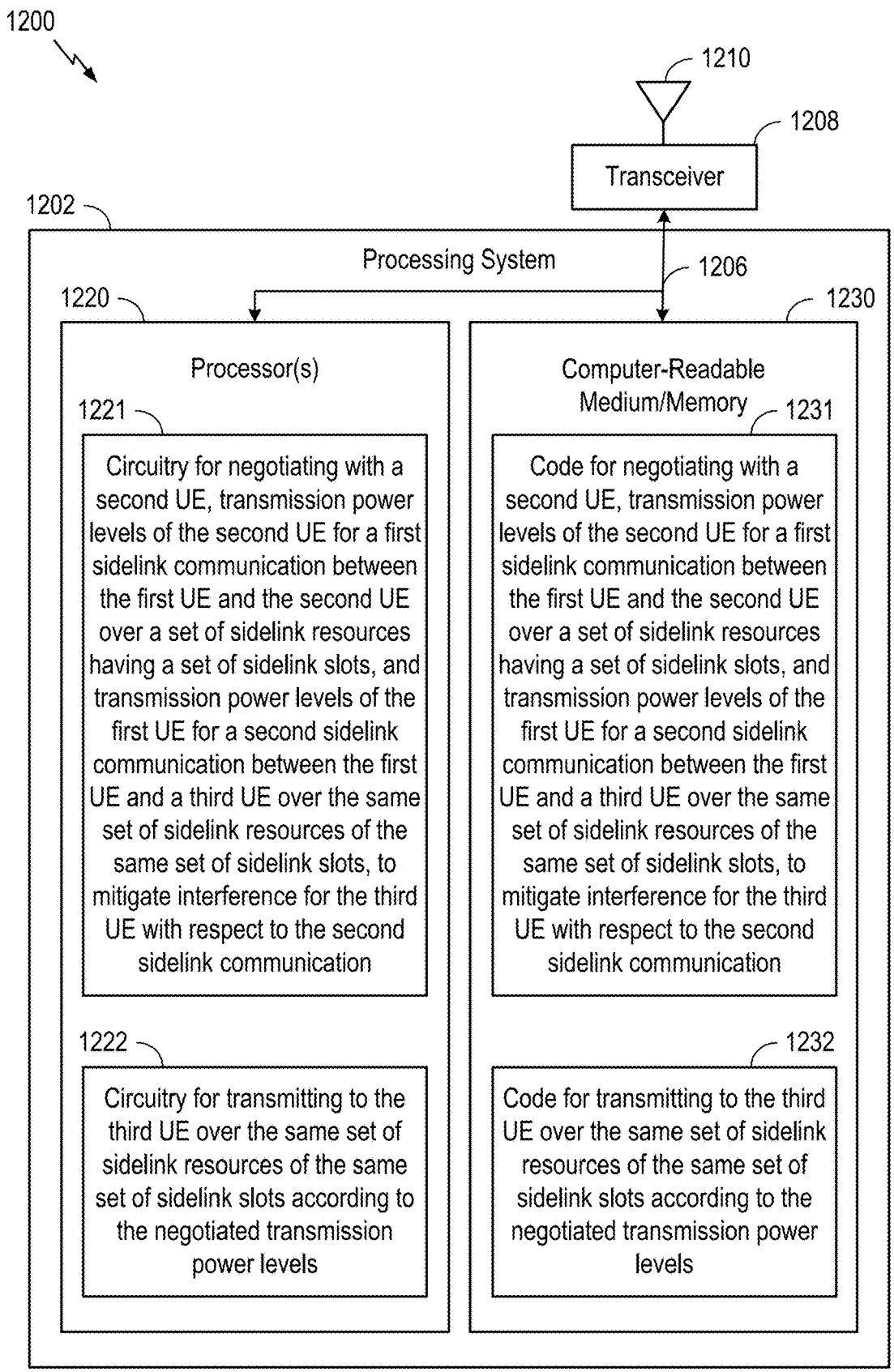
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 11. In some examples, communication device 1200 may be a user equipment 104 or a first UE as described, for example with respect to FIGS. 1, 2, and 10.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 11, or other operations for performing the various techniques discussed herein.

In the depicted example, computer-readable medium/memory 1230 stores code 1231 for negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication, and code 1232 for transmitting to the third UE over the same set of sidelink resources of the same set of sidelink slots according to the negotiated transmission power levels.

In the depicted example, the one or more processors 1220 include circuitry configured to implement the code stored in the computer-readable medium/memory 1230, including circuitry 1221 for negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication, and circuitry 1222 for transmitting to the third UE over the same set of sidelink resources of the same set of sidelink slots according to the negotiated transmission power levels.

Various components of communications device 1200 may provide means for performing the methods described herein, including with respect to FIG. 11.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for generating and/or determining may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including FD capability component 281).

Notably, FIG. 12 is an example, and many other examples and configurations of communication device 1200 are possible.

EXAMPLE CLAUSES

Implementation examples are described in the following numbered clauses:

Clause 1: A method for wireless communications by a first user equipment (UE), comprising: negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and transmitting to the third UE over the same set of sidelink resources of the same set of sidelink slots according to the negotiated transmission power levels.

Clause 2: The method of Clause 1, wherein the first UE is a full-duplex (FD) UE configured to receive and transmit signals over the same set of sidelink resources.

Clause 3: The method of Clause 1, wherein the first sidelink communication between the first UE and the second UE comprises a unicast session or groupcast session by the second UE.

Clause 4: The method of Clause 1, wherein the second communication has a higher priority than the first communication, and wherein negotiating with the second UE comprises transmitting, to the second UE, an indication for the second UE to reduce the transmission power levels of the second UE.

Clause 5: The method of Clause 1, wherein negotiating with the second UE comprises: receiving, from the third UE, a feedback on signal-to-interference-plus-noise ratio (SINR) regarding the second communication; and transmitting, to the second UE, an indication for the second UE to reduce the transmission power levels of the second UE by an offset value based on the feedback.

Clause 6: The method of Clause 1, further comprising determining whether to transmit to the third UE over the same set of sidelink resources of the same set of slots based on inter-UE coordination information.

Clause 7: The method of Clause 1, wherein both the first UE and the second UE are full-duplex (FD) UEs, wherein the second UE receives sidelink transmissions from a fourth UE over the set of sidelink resources, and wherein negotiating with the second UE comprises: determining only one of the first UE and the second UE to operate in FD mode over the same set of sidelink resources.

Clause 8: The method of Clause 7, wherein the determining is based on a priority ranking of the sidelink communications between the first UE and the second UE, the first UE and the third UE, and the third UE and the fourth UE.

Clause 9: The method of Clause 1, wherein both the first UE and the second UE are full-duplex (FD) UEs, wherein the second UE receives sidelink transmissions from a fourth UE over the set of sidelink resources, and wherein negotiating with the second UE comprises: determining both the first UE and the second UE to operate in FD mode over the same set of sidelink resources; and adjusting transmission power levels of the first UE and the second UE or coordinating beam selection by the first UE for transmission and reception.

Clause 10: The method of Clause 9, wherein adjusting transmission power levels comprises: reducing transmission power levels at the first UE to minimize interference imposed to the second UE.

Clause 11: The method of Clause 9, wherein coordinating beam selection by the first UE for transmission and reception comprises: transmitting in a first beam to the third UE; and receiving in a second beam from the second UE, wherein the first beam and the second beam incur a minimal interference with each other compared to interferences between other beams available to the first UE, the second UE, and the third UE.

Clause 12: The method of Clause 9, further comprising signaling, to the second UE, a set of preferred resources for the FD mode, the set of preferred resources being a subset of the set of sidelink resources.

Clause 13: The method of Clause 12, wherein the set of preferred resources for the FD mode comprises FD and half-duplex (HD) resources.

Clause 14: The method of Clause 12, wherein the FD resources are used by both the first UE and the second UE for transmission, and wherein the HD resources are used by the first UE for reception.

Clause 15: The method of Clause 9, further comprising: transmitting, to the third UE, a destination identifier (ID) of the second UE or a source ID of the first sidelink communication; receiving, from the third UE, a set of preferred resources based on measurements at the third UE of interference associated with the destination ID or the source ID.

Clause 16: A apparatus of a first user equipment (UE) for wireless communications, comprising: a memory; and a processor coupled with the memory, the processor and the memory configured to: negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and transmit to the third UE over the same set of sidelink resources of the same set of sidelink slots according to the negotiated transmission power levels.

Clause 17: The apparatus of Clause 16, wherein the first UE is a full-duplex (FD) UE configured to receive and transmit signals over the same set of sidelink resources.

Clause 18: The apparatus of Clause 16, wherein the first sidelink communication between the first UE and the second UE comprises a unicast session or groupcast session by the second UE.

Clause 19: The apparatus of Clause 16, wherein the second communication has a higher priority than the first communication, and wherein the processor and the memory are configured to negotiate with the second UE by transmitting, to the second UE, an indication for the second UE to reduce the transmission power levels of the second UE.

Clause 20: The apparatus of Clause 16, wherein the processor and the memory are configured to negotiate with the second UE by: receiving, from the third UE, a feedback on signal-to-interference-plus-noise ratio (SINR) regarding the second communication; and transmitting, to the second UE, an indication for the second UE to reduce the transmission power levels of the second UE by an offset value based on the feedback.

Clause 21: The apparatus of Clause 16, wherein the processor and memory are further configured to: determine whether to transmit to the third UE over the same set of sidelink resources of the same set of slots based on inter-UE coordination information.

Clause 22: The apparatus of Clause 16, wherein both the first UE and the second UE are full-duplex (FD) UEs, wherein the second UE receives sidelink transmissions from a fourth UE over the set of sidelink resources, and wherein the processor and the memory are configured to negotiate with the second UE by: determining only one of the first UE and the second UE to operate in FD mode over the same set of sidelink resources.

Clause 23: The apparatus of Clause 22, wherein the determining is based on a priority ranking of the sidelink communications between the first UE and the second UE, the first UE and the third UE, and the third UE and the fourth UE.

Clause 24: The apparatus of Clause 16, wherein both the first UE and the second UE are full-duplex (FD) UEs, wherein the second UE receives sidelink transmissions from a fourth UE over the set of sidelink resources, and wherein the processor and the memory are configured to negotiate with the second UE by: determining both the first UE and the second UE to operate in FD mode over the same set of sidelink resources; and adjusting transmission power levels of the first UE and the second UE or coordinating beam selection by the first UE for transmission and reception.

Clause 25: The apparatus of Clause 24, wherein adjusting transmission power levels comprises: reducing transmission power levels at the first UE to minimize interference imposed to the second UE.

Clause 26: The apparatus of Clause 24, wherein coordinating beam selection by the first UE for transmission and reception comprises: transmitting in a first beam to the third UE; and receiving in a second beam from the second UE, wherein the first beam and the second beam incur a minimal interference with each other compared to interferences between other beams available to the first UE, the second UE, and the third UE.

Clause 27: The apparatus of Clause 24, wherein the processor and the memory are further configured to: signal, to the second UE, a set of preferred resources for the FD mode, the set of preferred resources being a subset of the set of sidelink resources.

Clause 28: The apparatus of Clause 24, wherein the processor and the memory are further configured to: transmit, to the third UE, a destination identifier (ID) of the second UE or a source ID of the first sidelink communication; receive, from the third UE, a set of preferred resources based on measurements at the third UE of interference associated with the destination ID or the source ID.

Clause 29: An apparatus, comprising: a memory comprising executable instructions; one or more processors configured to execute the executable instructions and cause the apparatus to perform a method in accordance with any one of Clauses 1-15.

Clause 30: An apparatus, comprising means for performing a method in accordance with any one of Clauses 1-15.

Clause 31: A non-transitory computer-readable medium comprising executable instructions that, when executed by one or more processors of an apparatus, cause the apparatus to perform a method in accordance with any one of Clauses 1-15.

Clause 32: A computer program product embodied on a computer-readable storage medium comprising code for performing a method in accordance with any one of Clauses 1-15.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of defining user equipment (UE) capability for machine learning (ML) support across a network cell group in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a first user equipment (UE), comprising:
    negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and
    transmitting to the third UE over the same set of sidelink resources of the same set of sidelink slots according to the negotiated transmission power levels;
    wherein both the first UE and the second UE are full-duplex (FD) UEs, wherein the second UE receives sidelink transmissions from a fourth UE over the set of sidelink resources, and wherein negotiating with the second UE comprises:
        determining only one of the first UE and the second UE to operate in FD mode over the same set of sidelink resources;
        wherein the determining is based on a priority ranking of the sidelink communications between the first UE and the second UE, the first UE and the third UE, and the third UE and the fourth UE.

2. The method of claim 1, wherein the first UE is a full-duplex (FD) UE configured to receive and transmit signals over the same set of sidelink resources.

3. The method of claim 1, wherein the first sidelink communication between the first UE and the second UE comprises a unicast session or groupcast session by the second UE.

4. The method of claim 1, wherein the second communication has a higher priority than the first communication, and wherein negotiating with the second UE comprises:
    transmitting, to the second UE, an indication for the second UE to reduce the transmission power levels of the second UE.

5. The method of claim 1, wherein negotiating with the second UE comprises:
    receiving, from the third UE, a feedback on signal-to-interference-plus-noise ratio (SINR) regarding the second communication; and
    transmitting, to the second UE, an indication for the second UE to reduce the transmission power levels of the second UE by an offset value based on the feedback.

6. The method of claim 1, further comprising:
determining whether to transmit to the third UE over the same set of sidelink resources of the same set of slots based on inter-UE coordination information.

7. A method for wireless communications by a first user equipment (UE), comprising:
negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and
transmitting to the third UE over the same set of sidelink resources of the same set of sidelink slots according to the negotiated transmission power levels;
wherein both the first UE and the second UE are full-duplex (FD) UEs, wherein the second UE receives sidelink transmissions from a fourth UE over the set of sidelink resources, and wherein negotiating with the second UE comprises:
determining both the first UE and the second UE to operate in FD mode over the same set of sidelink resources; and
adjusting transmission power levels of the first UE and the second UE or coordinating beam selection by the first UE for transmission and reception.

8. The method of claim 7, wherein adjusting transmission power levels comprises:
reducing transmission power levels at the first UE to minimize interference imposed to the second UE.

9. The method of claim 7, wherein coordinating beam selection by the first UE for transmission and reception comprises:
transmitting in a first beam to the third UE; and
receiving in a second beam from the second UE, wherein the first beam and the second beam incur a minimal interference with each other compared to interferences between other beams available to the first UE, the second UE, and the third UE.

10. The method of claim 7, further comprising:
signaling, to the second UE, a set of preferred resources for the FD mode, the set of preferred resources being a subset of the set of sidelink resources.

11. The method of claim 10, wherein the set of preferred resources for the FD mode comprises FD and half-duplex (HD) resources.

12. The method of claim 10, wherein the FD resources are used by both the first UE and the second UE for transmission, and wherein the HD resources are used by the first UE for reception.

13. The method of claim 7, further comprising:
transmitting, to the third UE, a destination identifier (ID) of the second UE or a source ID of the first sidelink communication; and
receiving, from the third UE, a set of preferred resources based on measurements at the third UE of interference associated with the destination ID or the source ID.

14. A apparatus of a first user equipment (UE) for wireless communications, comprising:
a memory; and
a processor coupled with the memory, the processor and the memory configured to:
negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and
transmit to the third UE over the same set of sidelink resources of the same set of sidelink slots according to the negotiated transmission power levels;
wherein both the first UE and the second UE are full-duplex (FD) UEs, wherein the second UE receives sidelink transmissions from a fourth UE over the set of sidelink resources, and wherein the processor and the memory are configured to negotiate with the second UE by:
determining only one of the first UE and the second UE to operate in FD mode over the same set of sidelink resources;
wherein the determining is based on a priority ranking of the sidelink communications between the first UE and the second UE, the first UE and the third UE, and the third UE and the fourth UE.

15. The apparatus of claim 14, wherein the first UE is a full-duplex (FD) UE configured to receive and transmit signals over the same set of sidelink resources.

16. The apparatus of claim 14, wherein the first sidelink communication between the first UE and the second UE comprises a unicast session or groupcast session by the second UE.

17. The apparatus of claim 14, wherein the second communication has a higher priority than the first communication, and wherein the processor and the memory are configured to negotiate with the second UE by transmitting, to the second UE, an indication for the second UE to reduce the transmission power levels of the second UE.

18. The apparatus of claim 14, wherein the processor and the memory are configured to negotiate with the second UE by:
receiving, from the third UE, a feedback on signal-to-interference-plus-noise ratio (SINR) regarding the second communication; and
transmitting, to the second UE, an indication for the second UE to reduce the transmission power levels of the second UE by an offset value based on the feedback.

19. The apparatus of claim 14, wherein the processor and memory are further configured to:
determine whether to transmit to the third UE over the same set of sidelink resources of the same set of slots based on inter-UE coordination information.

20. A apparatus of a first user equipment (UE) for wireless communications, comprising:
a memory; and
a processor coupled with the memory, the processor and the memory configured to:
negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and transmit to the third UE over the same set of sidelink resources of the same set of sidelink slots according to the negotiated transmission power levels;

wherein both the first UE and the second UE are full-duplex (FD) UEs, wherein the second UE receives sidelink transmissions from a fourth UE over the set of sidelink resources, and wherein the processor and the memory are configured to negotiate with the second UE by:

determining both the first UE and the second UE to operate in FD mode over the same set of sidelink resources; and adjusting transmission power levels of the first UE and the second UE or coordinating beam selection by the first UE for transmission and reception.

21. The apparatus of claim 20, wherein adjusting transmission power levels comprises:

reducing transmission power levels at the first UE to minimize interference imposed to the second UE.

22. The apparatus of claim 20, wherein coordinating beam selection by the first UE for transmission and reception comprises:

transmitting in a first beam to the third UE; and receiving in a second beam from the second UE, wherein the first beam and the second beam incur a minimal interference with each other compared to interferences between other beams available to the first UE, the second UE, and the third UE.

23. The apparatus of claim 20, wherein the processor and the memory are further configured to:

signal, to the second UE, a set of preferred resources for the FD mode, the set of preferred resources being a subset of the set of sidelink resources.

24. The apparatus of claim 20, wherein the processor and the memory are further configured to:

transmit, to the third UE, a destination identifier (ID) of the second UE or a source ID of the first sidelink communication; and receive, from the third UE, a set of preferred resources based on measurements at the third UE of interference associated with the destination ID or the source ID.

25. A first user equipment (UE) comprising:

means for negotiating with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and means for transmitting to the third UE over the same set of sidelink resources of the same set of sidelink slots according to the negotiated transmission power levels;

wherein both the first UE and the second UE are full-duplex (FD) UEs, wherein the second UE receives sidelink transmissions from a fourth UE over the set of sidelink resources, and wherein negotiating with the second UE comprises:

means for determining both the first UE and the second UE to operate in FD mode over the same set of sidelink resources; and means for adjusting transmission power levels of the first UE and the second UE or coordinating beam selection by the first UE for transmission and reception.

26. A non-transitory computer-readable medium comprising computer-executable instructions that, when executed by one or more processors of a first user equipment (UE), cause the first UE to:

negotiate with a second UE, transmission power levels of the second UE for a first sidelink communication between the first UE and the second UE over a set of sidelink resources having a set of sidelink slots, and transmission power levels of the first UE for a second sidelink communication between the first UE and a third UE over the same set of sidelink resources of the same set of sidelink slots, to mitigate interference for the third UE with respect to the second sidelink communication; and transmit to the third UE over the same set of sidelink resources of the same set of sidelink slots according to the negotiated transmission power levels;

wherein both the first UE and the second UE are full-duplex (FD) UEs, wherein the second UE receives sidelink transmissions from a fourth UE over the set of sidelink resources, and wherein negotiating with the second UE comprises to:

determine both the first UE and the second UE to operate in FD mode over the same set of sidelink resources; and adjust transmission power levels of the first UE and the second UE or coordinating beam selection by the first UE for transmission and reception.

* * * * *